United States Patent

[11] 3,630,495

| [72] | Inventor | Walter N. Carroll<br>P. O. Box 11129, Cincinnati, Ohio 45211 |
|---|---|---|
| [21] | Appl. No. | 88,662 |
| [22] | Filed | Nov. 12, 1970 |
| [45] | Patented | Dec. 28, 1971 |

[54] MIXER UNIT
11 Claims, 8 Drawing Figs.

[52] U.S. Cl. ..................................... 259/182, 137/92
[51] Int. Cl. ..................................... B01f 3/14
[50] Field of Search ........................... 259/154, 149, 182, 183, 121, 122, 8, 23, 24; 137/4, 92

[56] References Cited
UNITED STATES PATENTS

| 2,452,142 | 10/1948 | Pecker | 137/92 |
| 2,668,442 | 2/1954 | Osbourne | 137/92 |
| 2,954,215 | 9/1960 | Warmkessel | 259/154 |
| 3,438,743 | 4/1969 | Grunewald | 137/4 |

Primary Examiner—Robert W. Jenkins
Attorney—Wood, Herron & Evans

ABSTRACT: A variable speed mixer compensates for variations in the viscosity of a material being mixed. An electric motor drives a differential with two outputs. One output is connected to a mixer shaft and another to a variable impedance. The variable impedance varies the speed of the mixer shaft in response to the load on the shaft, thereby maintaining the torque applied to the shaft at a constant level and controlling the differential to provide a constant load on the electric motor.

Patented Dec. 28, 1971

INVENTOR.
Walter N. Carroll
BY
Wood, Herron & Evans
ATTORNEYS

Patented Dec. 28, 1971
3,630,495
4 Sheets-Sheet 2
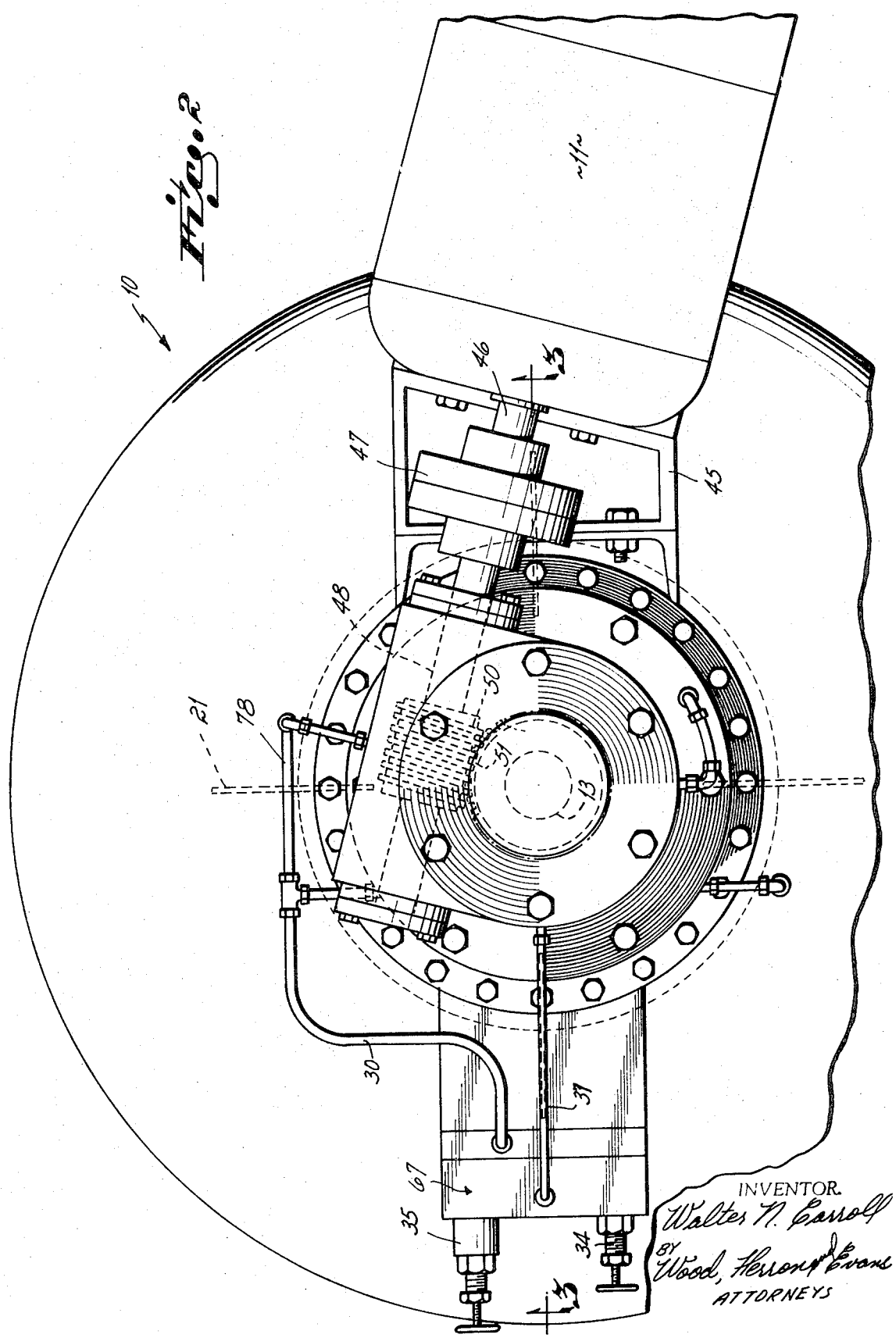
INVENTOR.
Walter N. Carroll
BY Wood, Herron & Evans
ATTORNEYS

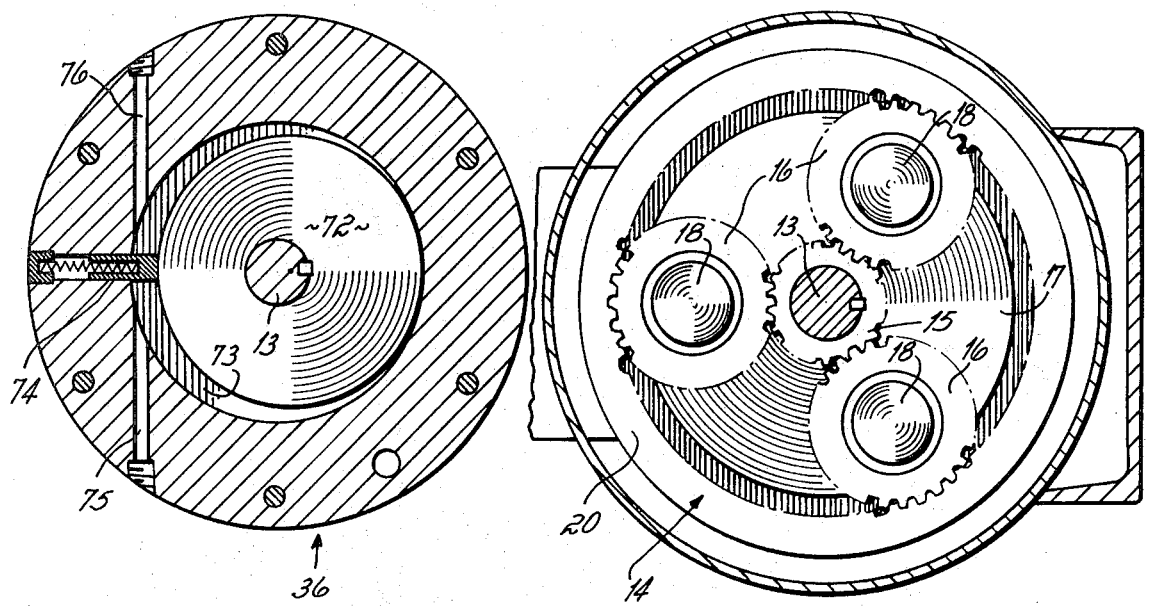
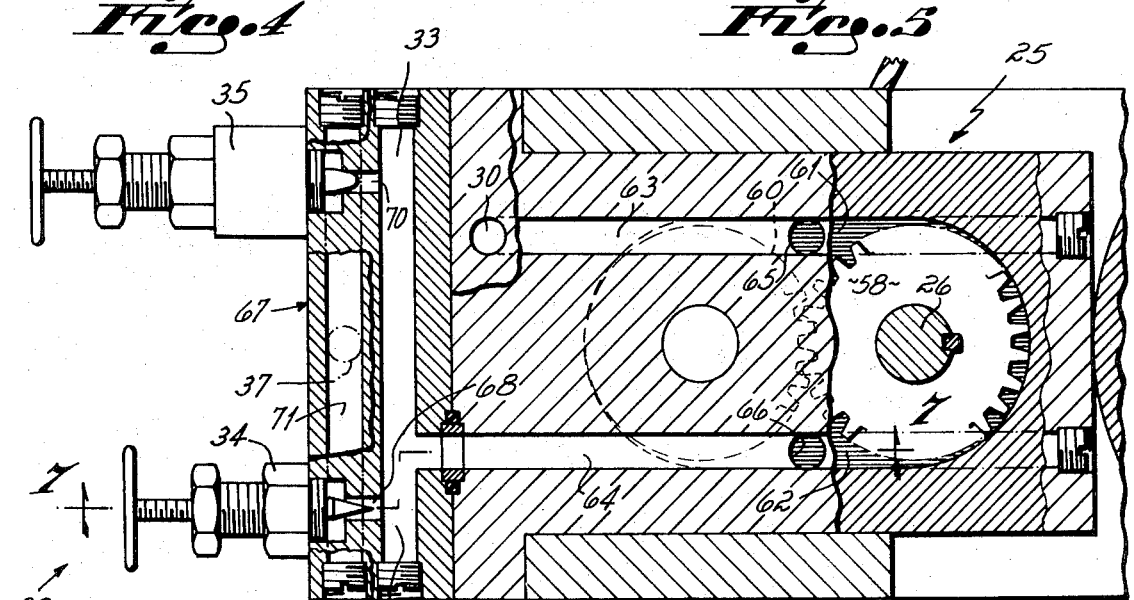
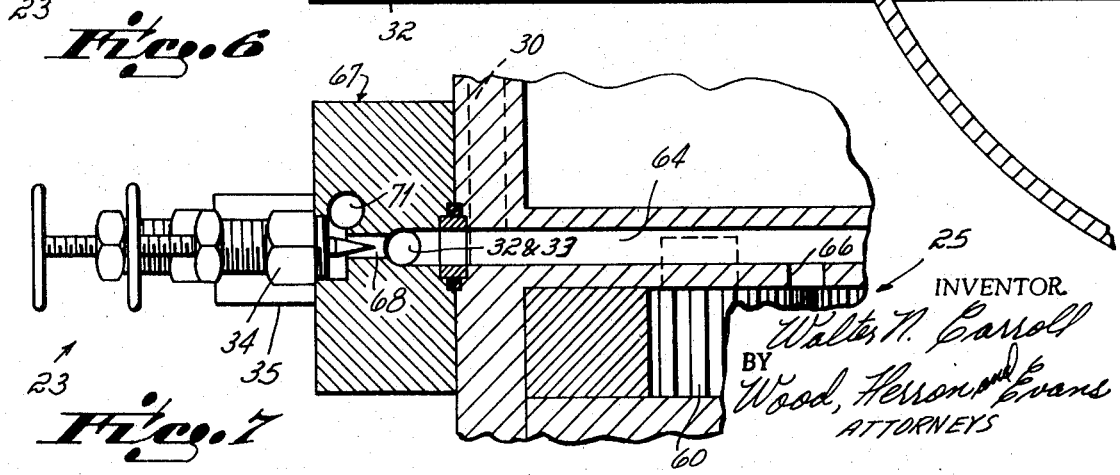

MIXER UNIT

BACKGROUND OF THE INVENTION

The present invention relates to apparatus for mixing foodstuffs and the like having varying viscosities, and more particularly to food mixing apparatus which automatically compensates for the variations in viscosity of the material being mixed.

Mixers of the type to which the present invention is directed are typically used for bulk mixing foods in large quantities in establishments such as bakeries, confectioneries and restaurants, as well as for mixing raw chemicals in bulk quantities in industrial chemical process plants. The mixers generally include a turbine or impeller blade, which in use is immersed in the bulk material being mixed. The mixing blade is mounted on a shaft, and rotates with the shaft to stir or mix the food or the like. The shaft on which the blade is mounted is usually driven, through assorted gearing, by a motor.

One problem inherent in mixing processes of the above type is that of variation in the viscosity, or thickness, of the material. For example, a given material to be mixed may have a certain viscosity at the beginning of the mixing operation, and another, different viscosity at the end of the operation.

Depending on the particular material, the final viscosity may be greater or lesser than the initial viscosity. Furthermore, not only does the viscosity of a given material vary during the mixing operation, but for different materials the initial viscosities vary.

It is generally desirable, in a given establishment, to utilize a minimum number of different types of mixing units. By types of mixing units is meant units having different viscosity handling capabilities. However, the variations in viscosity of materials found in use have made minimization of the number of different mixer units somewhat difficult to achieve in practice. For example, in a mixing unit designed for a highly viscous material, the mixer must provide greater power than one made for mixing a material of low viscosity. However, when such a unit is used to mix low viscosity material the motor will not deliver its full power capability due to a light load placed thereon and much of the mixer's potential will be wasted. Alternatively, if a low viscosity mixer is used for high viscosity materials, the excess viscosity over that for which the mixer is designed may slow the mixer drive motor down to the point where it burns out.

Additionally, where the viscosity of a given material changes during the mixing operation, e.g., from low to high viscosity, the mixer motor may initially be underloaded, thereby not developing its full horsepower, while thereafter becoming unduly loaded so as to severely slow down the motor to a point where it seriously overheats or burns out. Additionally, as the viscosity of the substance increases, the load increases, as does the horsepower input. Thus, in the beginning of the mixing operation, the motor is underloaded, i.e., the mixer output horsepower is below its rated value, while as the density increases the mixer becomes overloaded. Since the horsepower input is not constant, but starts at a below-rated level and then increases, the total time necessary to actually mix the substance takes an increased amount of time over that which it would take were the input horsepower at its rated value for the entire mixing cycle.

This problem of viscosity variation in the mixer field has to some extent been solved, or compensated for, by employing variable speed drives in combination with the mixer motor. By providing for variation in the speed of the mixer blade, inefficient underloading and/or dangerous overloading which damages the mixer motor is avoided.

As indicated, viscosity compensating mixers, generally consisting of a variable speed drive coupling the mixer blade and the motor, have existed in the mixer field. However, in order to achieve any degree of automatic control of the speed in response to viscosity variation, it has been necessary to provide some form of means to independently sense the variation in viscosity or some other parameter of the system which varies in some known manner with the viscosity. The sensor then operates to control the variable speed drive and regulate the speed of the mixer blade as is necessary to compensate for viscosity fluctuations. The particular system variable which is sensed, in addition to viscosity, may include such elements as motor horsepower, mixer blade speed, or the like.

The fact that the prior art mixers have required a viscosity sensing component or equivalent, which is separate and independent of the variable speed drive, is disadvantageous for a variety of reasons. For example, there is a lag between the stimulus, i.e., the sensed change in viscosity, and the speed correcting operation. Accuracy also has been a problem, particularly with respect to mixers using viscosity sensors since the substance to be mixed may not be at a uniform viscosity throughout and the viscosity sensed not representative of the true load on the mixing blade.

It has been an objective of this invention to provide a viscosity-compensating mixer of the variable speed type which eliminates the need for, and the attendant disadvantages of, separate and independent sensors for monitoring the viscosity of the mix or some parameter, such as blade speed, or horsepower, related to it, and which in the response thereto generates a speed regulating adjustment.

This objective has been accomplished in accordance with certain of the principles of this invention by providing, between the motor output and mixer blade drive shaft, a differential drive mechanism having an input driven by the output of the motor, and two outputs, one of which connects to the shaft mounting the mixer blade to drive it, and the other of which connects to a variable impedance loading or retarding means designed such that the impedance load or retarding force varies with the speed of the mixer blade drive shaft up to a specified adjustable maximum level. By virtue of this differential drive arrangement and variable impedance means, fluctuations in loading of the blade induced by variations in the viscosity of the mix are reflected back in the form of a blade speed reduction to the one differential output via the blade drive shaft, resulting in an increase in the retarding force applied to the other differential output, with the net result that output torque to the blade, and hence the mixer input horsepower, is maintained at a constant level notwithstanding the change in viscosity. Since the horsepower input to the mixer is constant, mixing time for a variable viscosity process is minimized, motor damage due to overloading is avoided, and the full potential of the mixer is constantly utilized.

In a preferred form the mixer drive and torque control of the present invention includes a standard electric motor which drives the differential. While various mechanical forms of suitable differentials exist, a preferred embodiment of the invention utilizes a differential of a sun and planetary gear type. The sun gear drives a plurality of planetary gears which are rotatably mounted on spindles carried by a spider plate. The mixer shaft, which is connected to agitating vanes or turbines, is connected to and receives its rotary motion from the spider plate. A ringlike rotatable housing member has gear teeth on its interior circumference for meshing with the planet gears. The ring member also has gear teeth on its outer circumference for meshing with a gear operatively connected to a variable impedance means which brakes the ring member.

This variable impedance means preferably includes an hydraulic pump driven by the ring gear housing. The pump has an output line with both a variable orifice and a variable relief valve connected in parallel in the line. As the pump is driven by the ring gear it creates a pressure in the output line which is controlled by the two valves. The relief valve is spring loaded so that it can be set for a maximum desired pressure in the output line. If the ring gear drives the pump to a point where it creates a pressure in excess of the relief valve programmed pressure, this valve opens, relieving this excess pressure and allowing the ring gear to speed up.

The other variable orifice is adjustable to infinitely control the pressure within the range of that maximum pressure set by the relief valve. Adjustment of this valve also controls the pressure in the output line and retards or lessens the retarding action of the pump so as to slow or speed up the ring gear. This then controls the speed of the mixer shaft.

Such an impedance means insulates the driven sun gear from load variations and thus keeps the electric motor operating at a constant load capacity and corresponding constant horsepower input. The motor can not be overloaded so as to burn itself out, nor does it waste its potential when the mixer shaft is lightly loaded. Since the drive operates at a constant horsepower input for any given time, mixing time for a given process is greatly reduced over those previous mixers wherein horsepower input varied from a low to a high level during the mixing operation. Furthermore, the variable impedance means can be infinitely adjusted for a desired impedance over its range, resulting in an infinitely adjustable mixer shaft speed within the available speed range.

Thus, one advantage of the invention is that it provides a variable speed mixer in an integral unit which operates at a constant horsepower input.

A further advantage of the invention is that it provides a variable speed mixer in an integral unit which maintains a constant torque on the mixer shaft by utilizing the mixer shaft to sense a variable such as the viscosity and density of the process, and to control an operatively connected variable impedance means.

Another advantage of the invention is that it provides a variable speed mixer operating with a constant horsepower input and mixer shaft torque to substantially increase efficiency of the mixing operation by materially decreasing the time required for mixing any given process.

These and other objects and advantages of the invention will become readily apparent to those of ordinary skill in the art from the following detailed description of the drawings in which:

FIG. 1 is a schematic view of the hydraulic circuit and mixer in accordance with the principles of my invention, FIG. 2 is a top plan view of a preferred embodiment of a mixer incorporating the principles of my invention, FIG. 3 is an axial cross section taken along lines 3—3 of FIG. 2, illustrating the mixer and pumps, FIG. 4 is a cross-sectional view taken along line 4—4 of FIG. 3 illustrating the supply pump, FIG. 5 is a cross-sectional view taken along line 5—5 of FIG. 3 illustrating the differential drive, FIG. 6 is a fragmentary cross-sectional view taken generally along line 6—6 of FIG. 3 illustrating the retard pump, FIG. 7 is a fragmentary cross-sectional view taken along line 7—7 of FIG. 6 illustrating the valve-mounting structure, and FIG. 8 is a graph illustrating one advantage of the improved mixer over prior art mixers.

GENERAL DESCRIPTION

FIG. 1 shows a preferred embodiment constructed in accordance with the principals of my invention. Referring to FIG. 1, the mixer 10 is seen to include a constant speed motor 11, shown schematically, with an output shaft connected to drive an input shaft 13 of a differential. While various differentials may be used, a sun and planetary gear differential 14 is preferred, having a sun gear 15 driven by input shaft 13; three planetary gears 16 meshing with the sun gear, which are mounted on a spider plate 17 by way of spindles 18; and a ring gear housing member 20, provided with teeth, which surrounds and meshes with the planetary gears 16. Sun gear 15 constitutes the input to the differential 14, and the spider 17 and ring gear 20 constitute separate outputs. When ring gear 20 is stationary, planetary gears 16 and spider 17 are driven by the rotating sun gear 15 at maximum speed. When ring gear 20 rotates, the planetary gears 16 and spider 17 rotate at less than maximum speed; the decrease being inversely proportional to the increase in ring gear rotation. Thus, while sun gear 15 is driven at a constant speed by motor 11 via shaft 13, the rate of rotation of the planetary gears 16 and spider plate 17 is controlled by the rate of rotation of ring gear 20. Turbine blades, agitators, impellers or other mixing means 21 are operatively connected to the spider 17 via a mixing shaft 22.

A variable impedance means 23 is utilized to retard rotation of the ring gear 20. Any suitable variable impedance means may be used without departing from the scope of the invention.

A preferred embodiment of the variable impedance means 23 utilizes a hydraulic pump circuit 24. The hydraulic circuit 24 includes a first pump 25 having a driving input shaft 26 driven by an external peripheral gear 27 fixed to the ring gear 20 through a pinion 28 mounted on the shaft 26. The pump 20 includes an input port connected to fluid input line 30 and an output port connected to fluid line 31. Output fluid line 31 connects to two parallel branch lines 32 and 33 which respectively include a variable restriction means or orifices in the form of a flow valve 34 and an adjustable pressure relief valve 35. Branch lines 32 and 33 return to the sump via line 37. Pump 36 supplies fluid to the input line 30 of the first pump 25 under pressure, as will later be described.

In a typical mixing operation, the mixer shaft 22, which is connected to one differential output, and the blades or impeller 21 are immersed into a substance to be mixed. When the mixer shaft 22 is rotated by the sun and planetary gear drive 14, a load is transmitted through the shaft 22 to the spider plate 17, planetary gears 16, and ring gear housing member 20 (the second differential output) to the hydraulic pump 25. The magnitude of the load on the ring gear 20 and the pump 25 depends upon the viscosity of the substance being mixed and the load itself is proportional to the load on the mixer shaft 22. Thus, when the load on the mixer shaft is heavy, the load on the ring gear 20 is heavy and tends to drive it against the retardation of pump 25. Rotation of the ring gear insulates the driven sun gear 15 and thus the motor 11 from the full load on the mixer shaft 22. Thus, by varying the speed of the ring gear 20 as the load on the mixer shaft 22 varies, a constant load may be maintained on the sun gear 15 and the motor 11.

The speed of the ring gear 20 is varied by controlling the hydraulic pump 25 through valves 34 and 35. Valve 35 is set to a predetermined pressure which corresponds to the desired maximum load to be placed on motor 11. When the load on pump 25 becomes excessive, due to the load placed on the ring gear 20 by shaft 22, valve 35 relieves the pressure through line 33 and allows the ring gear 20 to increase its speed. This, in turn, decreases the speed of the mixer shaft 22 and keeps the load from being transmitted to the sun gear 15 and the motor 11. Thus, a maximum load may be predetermined by setting valve 35, depending upon the desired motor load, and that load will not be exceeded throughout the operation.

Speed variation of mixer shaft 22 is obtained by adjustment of valve 34 in line 32. As valve 34 is closed, the back pressure on pump 25 and its retardation of ring gear 20 is increased, thus causing the mixer shaft speed to increase. Of course, if valve 34 is adjusted so that virtually no back pressure exists, ring gear 20 speeds up until shaft 22 comes to a standstill. As the valve 34 is closed, pressure and retardation of the ring gear 20 increases, thereby increasing the speed of the mixer shaft 22. This speed may be increased until the maximum pressure as set by valve 35 is reached and the ring gear may then overspeed, thereby maintaining a constant torque on the mixer shaft 22 but not allowing its speed to increase beyond that point. Thus, an infinite variation in mixer shaft speed may be obtained within the range set by valve 35.

In general operation, the spring-loaded relief valve 35 is adjusted in accordance with the maximum desired load to be placed on the drive motor 11 and valve 34 is set for a desired mixing speed. When a substance is to be mixed where the viscosity at the beginning of the mixing operation is less than the viscosity at the end of the operation, a light load is first placed on the mixer shaft 22 by virtue of this viscosity and shaft 22 does not transmit a relatively heavy load through the differential 14 to the ring gear 20. The ring gear is accordingly not driven at a high rate of rotation. However, as the viscosity of the substance that is being mixed increases, an increasingly greater load is transmitted from the mixer shaft 22 to the ring gear 20 and the ring gear is driven at an increasingly rapid rate.

For any set shaft speed, as the load on the ring gear increases, it is driven at an increasing rate, and as the back pressure on the output line 31 of pump 25 increases beyond that maximum pressure set by relief valve 35, the valve will open, allowing a concurrent release of pressure and an increase of ring gear speed. This allows the mixer shaft 22 to slow down. Thus, the increasing viscosity of the mixture is reflected back in the form of a shaft speed reduction and the torque on the shaft is thereby maintained at a constant level throughout this operation. Since the relief of the retardation or impedance allows the ring gear 20 to overspeed in this instance, the sun gear 15 is thereby insulated from an increasing load and the load on the motor 11 is maintained at a constant level, thereby resulting in a constant horsepower output from the motor.

In an alternative mixing procedure wherein the viscosity of the substance to be mixed is high at the beginning of the operation and low at the end of the operation, the load created on the mixer shaft by the substance is heavy at the beginning and tapers off toward the end. The mixer shaft 22 transmits a heavy load through the spider plate 17 and planetary gears 13 to the ring gear 20 and the ring gear is thereby speeded up. As previously stated, the ring gear is, however, retarded by the gear pump 25. This retardation is controlled by the setting of the throttle valve 34 and the maximum pressure setting of the release valve 35. Within the maximum pressure range setting of the release valve 35 the speed of the pump is controlled by the throttling valve 34 and again, the speed of the ring gear 20, and thereby the mixer shaft 22, is infinitely adjustable within that range. As the viscosity of the substance decreases, the load transmitted to the ring gear 20 by the mixer shaft 22 also decreases, the gear slows down, and the shaft is speeded up. Thus, the decreasing viscosity of the mixture is here reflected back in the form of a shaft speed increase and the torque on the shaft is thereby maintained at a constant level throughout this operation.

It can thus be readily observed that during a mixing operation where the beginning viscosity is either high or low and the ending viscosity is respectively low or high, the variation in the load on the mixer shaft at any particular instant is reflected by variation in the speed of rotation of the mixer shaft and thus the torque in the shaft is maintained at a constant level. This constant torque enables the constant speed driving motor to maintain a constant power input into the system and thus the power input into the mixing operation is at a constant level throughout. The motor will not be underloaded, resulting in a loss of mixing potential, nor can it become severely overloaded and burn out.

I have found that the application of a constant power input to a substance to be mixed by way of a mixing shaft and blades accomplishes the particular mixing result desired in a much shorter time than previous mixers.

The comparison graph 40 of FIG. 8 shows this advantage. Plotting power input against the time that the power is applied to the substance to be mixed, line 41 represents the constant horsepower input of a mixer constructed in accordance with the principals of my invention and line 42 represents the variable horsepower input of mixers known in the prior art. The areas under the lines represent a power rating of, for instance, horsepower-minutes as applied to the process. Area A is indicative of the horsepower-minutes applied by my mixer and area B is indicative of the horsepower-minutes applied by prior art mixers.

To achieve any given mixing result, i.e., desired viscosity or degree of integration, a certain power, i.e., horsepower-minutes, must be applied to the material to be mixed. In order to achieve a particular result, the total power applied to the material must be the same, regardless of the mixer used. Thus in this comparison, to achieve the same mixing result by both my improved mixer and the prior art mixer, area A, under line 41, must equal area B, under line 42 on the graph. The horsepower, $H_2$, of my drive is maintained constant through the mixing. The time that the power is applied is indicated at $T_1$, and the power applied to the process is A.

In prior art mixers, horsepower is not constant and thus the motor (where the material is at a low initial viscosity) is at first underloaded, developing a small starting horsepower $H_1$. As the process increases in viscosity, the horsepower increases, as shown by line 42, until the area B, which is equal to area A, is attained under the line 42 at some time, $T_2$. It can thus be seen that my improved mixer, with its constant horsepower input, reaches a given, predetermined and desired result in a much shorter time than the mixers of the prior art by virtue of the fact that its total power application takes a relatively lesser amount of time. It is further noted that this is accomplished with a single, integral unit using elements of the mixer itself as a torque control.

Detailed Description

Figure 1:
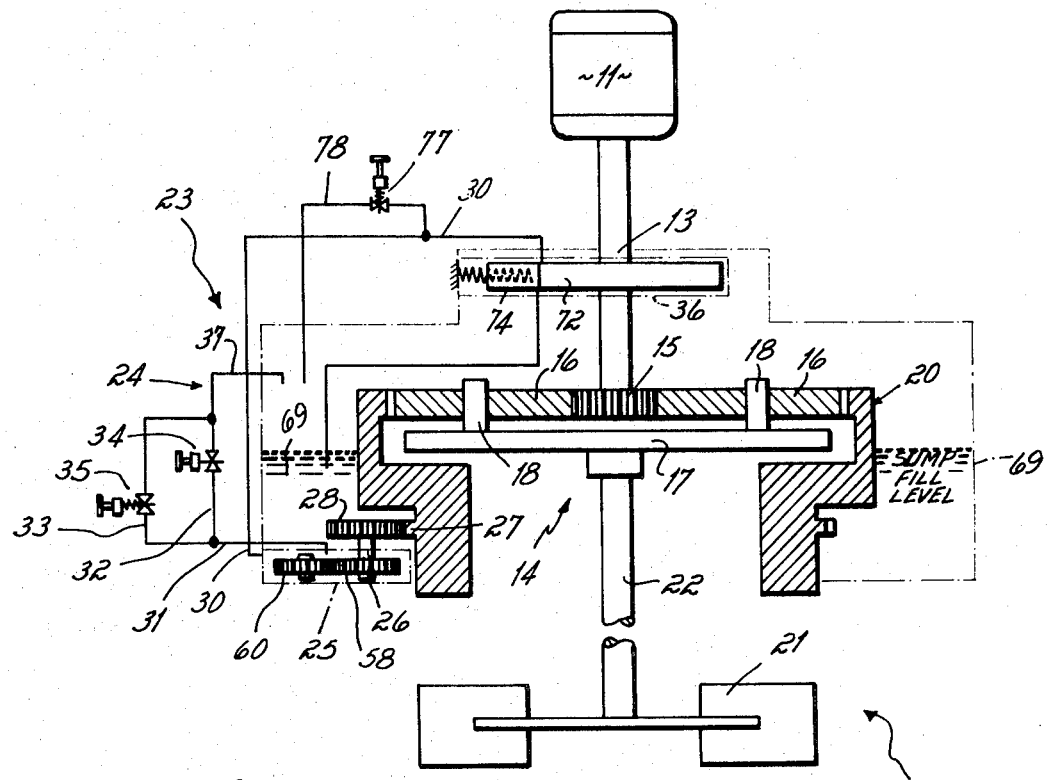
Figure 8:
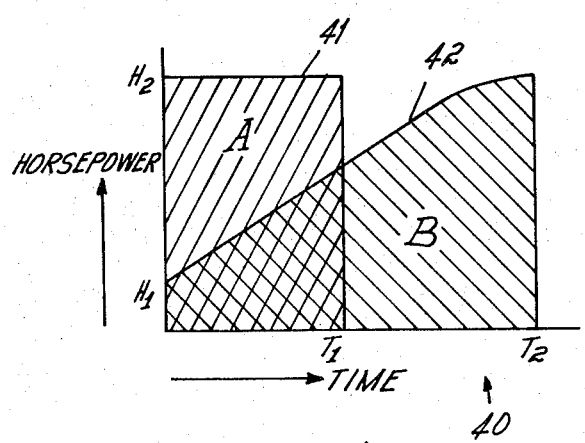

Referring specifically to FIG. 2, there is shown the motor 11 mounted on the mixing unit by way of a rigid flange or mounting member 45. The motor may be any standard normal torque motor operating at a constant speed and at a suitable horsepower rating as well known in the art. I have found that a motor operating at a speed of about 1,750 r.p.m. is desirable. The motor has an output shaft 46 which is connected through an appropriate flexible coupling 47 to a shaft 48. Coupling 47 is flexible to allow for any shaft misalignment and is of a type known in the art. Shaft 48 is connected to a spiral gear or a worm gear 50 which meshes with another spiral gear or pinion gear 51. Pinion gear 51 is connected to differential input shaft 13.

Figure 3:
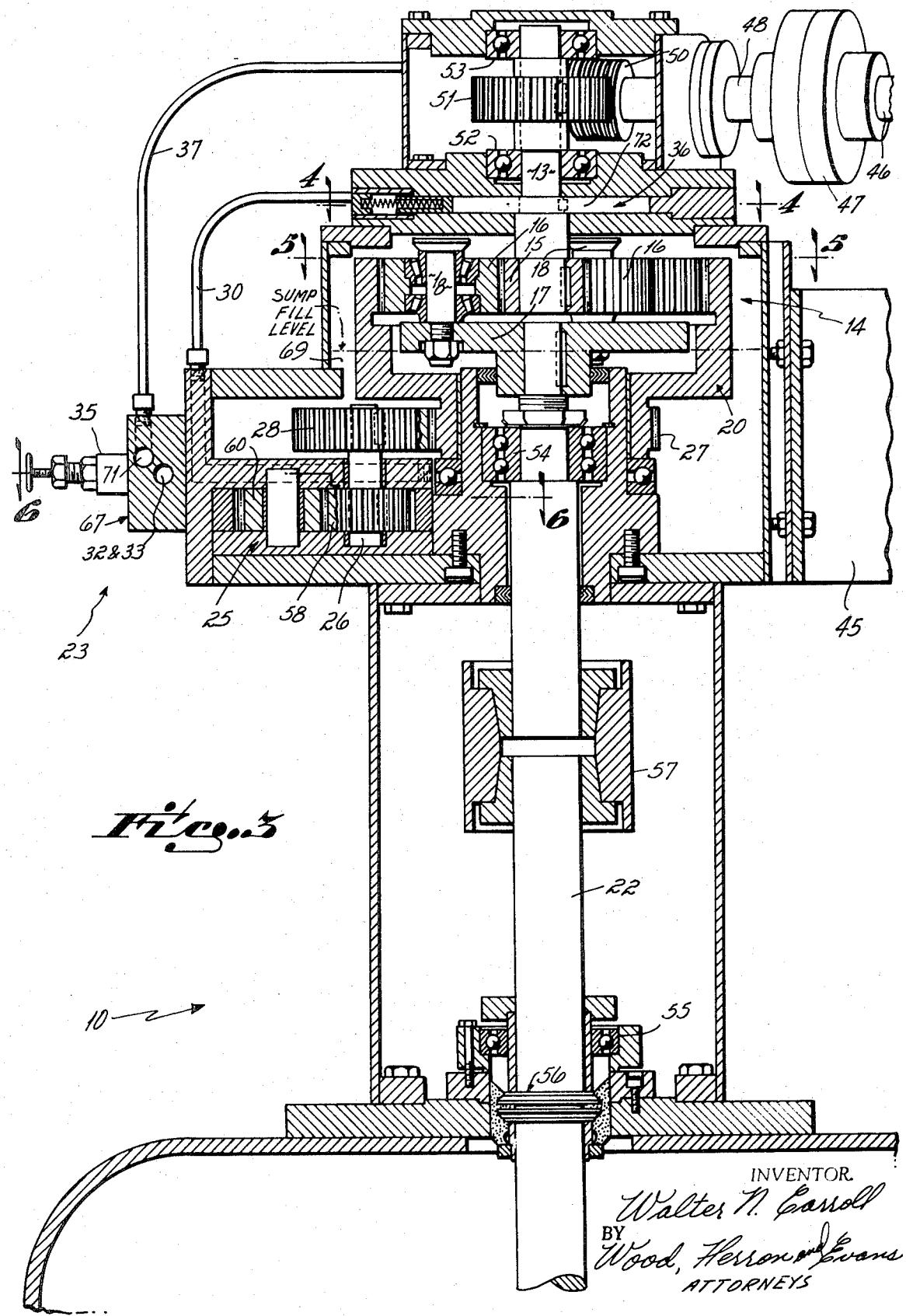

Referring now to FIG. 3, it can be seen that shaft 13 is journaled for rotation in bearings 52 and 53. Shaft 13 comprises a singular differential input and is keyed to the sun gear 15. The sun gear 15 is surrounded by a plurality, and preferably three, planetary gears 16. The relationship of the sun gear 15, planetary gears 16, and ring gear 20 is most clearly shown in FIG. 5. The planet gears 16 are rotatably spindled to the spider plate 17 by way of the spindles 18. The ring gear 20 encircles the planet gears 16 and includes gear teeth on its interior circumference which teeth mesh with the planet gears 16. At a lower point on the ring gear 20, the toothed gear 27 is provided on its outer circumference for driving a pump 25, as described above. Spider plate 17 and ring gear 20 comprise the two outputs of the differential 14.

Mixer shaft 22 is drivingly connected to the spider plate 17, and is mounted for rotation through bearings 54 and 55 to extend from the differential into a substance to be mixed. The lower actual mixing end of shaft 22 (not shown in FIG. 3) is connected to turbine blades, agitators or impellers for mixing the substance. Seals 56 are provided for keeping any lubricating materials or other fluids out of the substance which is being mixed. As seen in FIG. 3, shaft 22 may be split into two parts which are connected to each other by a suitable rigid connector 57. Use of such a connector maintains shaft alignment between the differential 14 and the bearings 55 and allows for ease in mixer shaft changing or repair.

The variable impedance means 23 is connected to an output of the differential 14. This variable impedance means may be in the form of a variable speed direct current or universal motor, with a shunt wound field and external voltage control rheostat to provide both variable speed driving and braking of the differential output. A preferred embodiment, however, of the variable impedance means includes a pump and an hydraulic circuit.

The hydraulic pump 25 is best seen in FIG. 6. It can be seen that shaft 26 extends into the pump 25 and is keyed to a gear 58. An idler gear 60 is rotatably spindled so as to mesh with gear 58. The two gears 58 and 60 are encased in a gear chamber so that as they rotate, they can transfer fluid in the spaces between their teeth from a first cavity 61 to a second cavity 62 in which the fluid may be highly pressurized. The pump has a first passage or bore 63 which constitutes a portion of the fluid input line 30 and a second passage or bore 64 which constitutes a portion of the fluid output line 21. A first transverse bore 65 connects the bore 63 with the cavity 61 and the cavity 62 is connected to the bore 64 by a second transverse bore 66. As shaft 26 and gear 58 are turned, for instance, in a clockwise manner, fluid is carried by the spaces between the teeth of both gears 58 and 60 around the circumference of the gears from cavity 61 into cavity 62, from where the fluid flows through bores 66 and 64. Bore 64 is connected to a manifold 67 which includes the lines 32 and 33, in which are mounted the throttling valve 34 and relief valve 35. Throttle valve 34 may be a standard needle type valve and relief valve 35 may be a known type of pressure release valve. Port 68 is associated with throttling valve 34 and port 70 is associated with relief valve 35. Relief valve 35 is a spring-loaded pressure release valve utilizing a spring of variable tension which may be set so as to cause the valve to open port 70 when the pressure in line 33 reaches a predetermined level. The valve and port arrangement is more clearly seen in FIG. 7. It can be seen that valves 34 and 35 are adjustable to permit fluid from the lines 32 or 33 to move into a bore 71 which is a portion of the sump return line 37.

An eccentric pump 36 (FIG. 4) is provided for supplying fluid to gear pump 25. Pump 36 is a hydraulic vane type pump as is generally known, utilizing an eccentrically mounted disc 72, a cavity 73, and a spring-loaded plunger 74. The pump may be independently driven but is preferably driven by the shaft 13. Disc 72 is keyed to shaft 13 and is driven thereby. Pump 36 draws fluid from a sump 69 through bore 75 into a suction chamber of cavity 73. Preferably, the sump is in the main housing for the several gears, bearings, etc. which are utilized to drive the mixer. The level is indicated in FIG. 3 by the line labeled "sump fill level." In this manner, the fluid utilized by the pumps for determining the drive to mixer speed ratio also serves as the lubricant for the gears. As disc 72 rotates, it draws fluid from the sump into the chamber and draws it around cavity 73; for instance, in a counterclockwise direction. The fluid is then forced into a pressure chamber and out through bore 76 which is a portion of line 30, to the gear pump 25. Plunger 74 rides on disc 72 to separate the suction and pressure chambers of cavity 73. The pressure in bore 76 and line 30 may be regulated by a spring-loaded relief valve 77 (FIG. 1) in line 78, the line 78 being in parallel with the line 26. Providing this pressure on hydraulic pump 25 insures that any inertia of the system which tends to keep the ring gear stationary will overcome when the ring gear is started from a complete stop or when it is only slowly driven due to a relatively light load on the mixer shaft. Driving this pump from shaft 13 creates an additional load on motor 11, however valve 77 may be adjusted to cooperate with relief valve 35 in controlling the maximum load desired to be placed on the motor. Furthermore, the load this pump creates is generally a negligible amount. It is to be understood that sump return line 37 returns fluid back to the sump 69 from which it can be drawn into pump 36 through bore 75 and recirculated.

It should be noted that the pressure in cavity 62 and bore 64 of output line 31 is proportional to the load placed on pump drive gear 28 by gear 27 of ring gear 20, and that gear pump 25 may be retarded by increasing the pressure in this line. Thus by closing the throttling valve 34, pressure in line 31 is increased and the pump is retarded.

Maximum pressure in line 31 may be automatically controlled by valve 35 which is in parallel with valve 34. Valve 35 is preset to a desired maximum pump load corresponding to a desired motor load, and if the pump is driven to produce a pressure beyond this amount by the ring gear 20, valve 35 opens and relieves the excessive pressure. As previously stated, this allows ring gear 20 to speed up, thereby relieving an excessive load on motor 11 and maintaining it at a constant horsepower output level.

While I have described my invention in detail, variations and modifications will become apparent to those of skill in the art without departing from the scope of the invention, and I therefore intend to be bound only by the scope of the appended claims.

I claim:

1. In a variable speed mixer for mixing variable viscosity material, which mixer includes a mixer shaft with attached turbine blades which in use are immersed in the material to be mixed, and which mixer further includes means for automatically compensating mixer shaft speed for viscosity variations of the material, the improvement comprising:
   an electrical motor operating at a constant speed,
   differential means having an input connected to be driven at said constant speed by said motor,
   a first differential output connected to drive said mixer shaft, and a second differential output, and
   variable impedance means operatively connected to said second output of said differential means for varying the speed of the mixer shaft in response to the load on the mixer shaft, thereby maintaining the torque applied to said mixer shaft constant and controlling the differential means to provide a constant load on said motor.

2. The improvement of claim 1 wherein the differential means comprises meshing sun and planetary gears with a rotatable ring gear means meshing with said planetary gears, said sun and planetary gears connected between said motor and said mixer shaft, and said ring gear means connected to said variable impedance means for controlling the rate of rotation of the planetary gears about the sun gear and in turn the speed of said mixer shaft as a function of said viscosity.

3. The improvement of claim 2 wherein said sun gear is driven by said motor, and said planetary gears are rotatably spindled to a plate, said mixer shaft being connected to receive motion from said plate.

4. The improvement of claim 2 wherein said variable impedance means comprises a first hydraulic pump having a driving input connected to be driven by said ring gear means, a fluid input, and a fluid output with valve means for variably retarding said pump and thereby said ring gear means.

5. The improvement of claim 4 wherein said valve means includes a throttling valve for controlling the speed of the mixer shaft and a relief valve for controlling the maximum retardation of said pump.

6. The improvement of claim 5 wherein said throttle valve and said relief valve are connected in parallel to said fluid output of said pump.

7. The improvement of claim 4 further comprising a second hydraulic pump for supplying fluid under pressure to said fluid input of said first pump to facilitate initial rotary movement of said ring gear in response to increased loading of said mixer shaft via said blades.

8. The improvement of claim 1 wherein said variable impedance means comprises a first hydraulic pump having a driving input connected to be driven by said second output, a fluid input, and a fluid output with valve means for variably retarding said pump and thereby said ring gear means.

9. The improvement of claim 8 wherein said valve means includes a throttling valve for controlling the speed of the mixer shaft and a relief valve for controlling the maximum retardation of said pump.

10. The improvement of claim 9 wherein said throttle valve and said relief valve are connected in parallel to said fluid output of said pump.

11. The improvement of claim 8 further comprising a second hydraulic pump for supplying fluid under pressure to said fluid input of said first pump to facilitate initial movement of said second output in response to increased loading of said mixer shaft via said blades.

\* \* \* \* \*

UNITED STATES PATENT OFFICE
CERTIFICATE OF CORRECTION

Patent No. 3,630,495　　　　　　　　Dated　December 28, 1971

Inventor(s)　　　Walter N. Carroll

It is certified that error appears in the above-identified patent and that said Letters Patent are hereby corrected as shown below:

Column 7, line 48, insert "be" after the word --will--.

Signed and sealed this 2nd day of May 1972.

(SEAL)
Attest:

EDWARD M. FLETCHER, JR.　　　　　ROBERT GOTTSCHALK
Attesting Officer　　　　　　　　　Commissioner of Patents